(12) United States Patent  
Penfield et al.

(10) Patent No.: US 11,727,702 B1  
(45) Date of Patent: Aug. 15, 2023

(54) AUTOMATED INDEXING AND EXTRACTION OF INFORMATION IN DIGITAL DOCUMENTS

(71) Applicant: Velocity EHS Inc., Chicago, IL (US)

(72) Inventors: Julia Penfield, Seattle, WA (US); Aatish Suman, Austin, TX (US); Veeru Talreja, Morgantown, WV (US); Misbah Zahid Khan, Mississauga (CA)

(73) Assignee: VelocityEHS Holdings, Inc., Chicago, IL (US)

( * ) Notice: Subject to any disclaimer, the term of this patent is extended or adjusted under 35 U.S.C. 154(b) by 0 days.

(21) Appl. No.: 18/098,055

(22) Filed: Jan. 17, 2023

(51) Int. Cl.
| | |
|---|---|
| *G06V 10/82* | (2022.01) |
| *G06V 30/24* | (2022.01) |
| *G06F 40/205* | (2020.01) |
| *G06F 40/284* | (2020.01) |
| *G06F 40/258* | (2020.01) |
| *G06F 40/295* | (2020.01) |
| *G06V 30/19* | (2022.01) |
| *G06V 30/413* | (2022.01) |

(52) U.S. Cl.
CPC ........ *G06V 30/2528* (2022.01); *G06F 40/205* (2020.01); *G06F 40/258* (2020.01); *G06F 40/284* (2020.01); *G06F 40/295* (2020.01); *G06V 10/82* (2022.01); *G06V 30/19147* (2022.01); *G06V 30/413* (2022.01)

(58) Field of Classification Search
CPC ............... G06V 30/2528; G06V 10/82; G06V 30/19147; G06V 30/413; G06F 40/205; G06F 40/258; G06F 40/284; G06F 40/295
USPC ....................................................... 382/156
See application file for complete search history.

(56) References Cited

U.S. PATENT DOCUMENTS

| | | | |
|---|---|---|---|
| 2010/0092095 A1* | 4/2010 | King | G06Q 30/02 382/229 |
| 2022/0197958 A1* | 6/2022 | Volynets | G06F 16/9535 |

\* cited by examiner

*Primary Examiner* — Charlotte M Baker  
(74) *Attorney, Agent, or Firm* — K&L Gates LLP

(57) ABSTRACT

Systems and methods for automated indexing and extraction of information in digital documents are disclosed. A method may comprise selecting a page number of a digital document to identify a page containing targeted information; inputting an image of the page into a visual machine learning network (visual ML), wherein the visual ML is trained to recognize text associated with the targeted information in an image; identifying by the visual ML, a section of the image that contains the targeted information; inputting the page number, the digital document, and coordinates of the section into an extraction module; and extracting the targeted information by the extraction module from the section.

20 Claims, 11 Drawing Sheets

FROM FIG. 7A

704 — Page image (2nd)

Safety Data Sheet
acc. to OSHA HCS

Page 3/11

Printing date 03/28/2016

Reviewed on 03/28/2016

Trade name: ST-SP/228-BC4F-S (contd of page 2)

| 554-13-2 | Lithium carbonate | 0.1-≤2.5% |
| --- | --- | --- |
| 14808-60-7 | Quartz (SiO2) | 0.1-≤2.5% |
| 1333-86-4 | Carbon black | 0.1-≤2.5% |

•Additional information:
The product may contain, in some of the raw materials, crystalline silica as a trace element (quartz, cristobalite, tridymite). Process of the product may generate crystalline silica, which can cause respiratory infections due to silicosis.

4 First-aid measures

•Description of first aid measures
•General information:
Symptoms of poisoning may even occur after several hours: therefore medical observation for at least 48 hours after the accident.
•After inhalation: Supply fresh air, consult doctor in case of complaints.
•After skin contact: Generally the product does not irritate the skin.
•After eye contact: Rinse opened eye for several minutes under running water. If symptoms persist, consult a doctor.
•After swallowing: If symptoms persist consult a doctor.
•Information for doctor:
•Most important symptoms and effects, both acute and delayed No further relevant information available.
•Indication of any immediate attention and special treatment needed
No further relevant information available.

5 Fire-Fighting measures

•Extinguishing media
•Suitable extinguishing agents:
CO2, extinguishing powder or water spray. Fight larger fires with water spray or alcohol resistant foam.
•Special hazards arising from the substance or mixture: No further relevant information is available.
•Advice for firefighters
•Protective equipment: Do not inhale explosion gases or combustion gases.

6 Accidental release measures

•Personal precautions, protective equipment and emergency procedures ????
Respiratory protective device
•Environmental precautions: Do not allow to enter sewers /surface or ground water.
•Methods and material for containment and cleaning up:
Dispose contaminated material as waste according to item 13.
Ensure adequate ventilation.
•Reference to other sections:
See Section 7 for information on safe handling.
See Section 8 for information on personal protection equipment.
See Section 13 for disposal information.

(contd on page 4)

| Safety Data Sheet acc. to OSHA HCS | Page 2/11 |
|---|---|
| Printing date 03/28/2016 | Reviewed on 03/28/2016 |

Trade name: ST-SP/228-BC4F-S

•Hazard-determining components of labeling: (contd of page 1)
Calcium silicate
Quartz (SiO2)
Aluminium oxide
•Hazard statements
Causes serious eye irritation.
May cause cancer.
Causes damage to organs through prolonged or repeated exposure.
•Precautionary statements
Do not breathe dust/fume/gas/mist/vapors/spray.
Wear eye protection / face protection.
Wash thoroughly after handling.
Do not eat, drink or smoke when using this product.
Obtain special instructions before use.
Do not handle until all safety precautions have been read and understood.
If in eyes: Rinse cautiously with water for several minutes. Remove contact lenses, if present and easy to do.
Continue rinsing.
IF exposed or concerned: Get medical advice/attention.
If eye irritation persists: Get medical advice/attention.
Get medical advice/attention if you feel unwell.
Store locked up.
Dispose of contents/container in accordance with local/regional/national/international regulations.
Wash thoroughly after handling.
•Classification system:
•NFPA ratings (scale 0-4)
 Health=2
 Fire=0
 Reactivity=0
HMIS-ratings (scale 0-4)
HEALTH  Health= 2
FIRE  Fire=0
REACTIVITY  Reactivity=0
•Other hazards
•Results of PBT and vPvB assessment
•PBT: Not applicable.
•vPvB: Not applicable.

3 Composition/information on ingredients
•Chemical characterization: Mixtures
•Description: Mixtures of the substances listed below with nonhazerdous additions.

| •Dangerous components: | | |
|---|---|---|
| 13983-17-0 | Calcium silicate | 25-50% |
| 7789-75-5 | Calcium fluoride | 10-<25% |
| 65997-17-3 | Glass powder | 10-<25% |
| 497-19-8 | Sodium carbonate | 10-<25% |
| 546-93-0 | Magnesite | 2.5-<10% |
| 1344-28-1 | Aluminium oxide | 2.5-<10% |

(contd on page 3)

FIG. 8

|  | Example 1 |  |
|---|---|---|
| Input | SDS document | 1014005.pdf |
|  | Page number (1st) | 2 |
|  | Page number (2nd) | 3 |
|  | Table coordinates (1st page) | 903 — [1730,189,1967,1505] |
|  | Table coordinates (2nd page) | 904 — [289,185,409,1516] |
| Output | Dataframe (1st table) | <table><tr><td></td><td>0</td><td>1</td><td>2</td></tr><tr><td>0</td><td>13983-17-0</td><td>Calcium silicate</td><td>25-50%</td></tr><tr><td>1</td><td>7789-75-5</td><td>Calcium fluoride</td><td>10-<25%</td></tr><tr><td>2</td><td>65997-17-3</td><td>Glass powder</td><td>10-<25%</td></tr><tr><td>3</td><td>497-19-8</td><td>Sodium carbonate</td><td>10-<25%</td></tr><tr><td>4</td><td>546-93-0</td><td>Magnesite</td><td>2.5-<25%</td></tr><tr><td>5</td><td>1344-28-1</td><td>Aluminium oxide</td><td>2.5-<25%</td></tr></table> |
|  | Dataframe (2nd table) | <table><tr><td></td><td>0</td><td>1</td><td>2</td></tr><tr><td>0</td><td>554-13-2</td><td>Lithium carbonate</td><td>0.1-≤2.5%</td></tr><tr><td>1</td><td>14808-60-7</td><td>Quartz (SiO2)</td><td>0.1-≤2.5%</td></tr><tr><td>2</td><td>1333-86-4</td><td>Carbon black</td><td>0.1-≤2.5%</td></tr></table> |

FIG. 9

|       |                        | Example 1 (10140045) | | |
|-------|------------------------|---|---|---|
|       |                        |   | 0 | 1 | 2 |
| Input | Dataframe (1st table) 1001 | 0 | 13983-17-0 | Calcium silicate | 25-50% |
|       |                        | 1 | 7789-75-5 | Calcium fluoride | 10-<25% |
|       |                        | 2 | 65997-17-3 | Glass powder | 10-<25% |
|       |                        | 3 | 497-19-8 | Sodium carbonate | 10-<25% |
|       |                        | 4 | 546-93-0 | Magnesite | 2.5-<10% |
|       |                        | 5 | 7789-75-5 | Aluminium oxide | 2.5-<10% |
|       | Dataframe (2nd table) 1002 |   | 0 | 1 | 2 |
|       |                        | 0 | 554-13-2 | Lithium carbonate | 0.1-≤2.5% |
|       |                        | 1 | 14808-60-7 | Quartz (SiO2) | 0.1-<2.5% |
|       |                        | 2 | 1333-86-4 | Carbon black | 0.1-<2.5% |

| | | LibraryDocumentID | Ingredient | CAS | Operator | Upper | Lower |
|---|---|---|---|---|---|---|---|
| Output | Dataframe 1003 | 0 | 10140045 | Aluminium oxide | 1344-28-1 | - | 10.0 | 2.5 |
| | | 1 | 10140045 | Calcium fluoride | 789-75-5 | - | 25.0 | 10.0 |
| | | 2 | 10140045 | Calcium silicate | 13983-17-0 | - | 50.0 | 25.0 |
| | | 3 | 10140045 | Carbon black | 1333-86-4 | - | 2.5 | 0.1 |
| | | 4 | 10140045 | Glass powder | 65997-17-3 | - | 25.0 | 10.0 |
| | | 5 | 10140045 | Lithium carbonate | 554-13-2 | - | 2.5 | 0.1 |
| | | 6 | 10140045 | Magnesite | 546-93-0 | - | 10.0 | 2.5 |
| | | 7 | 10140045 | Quartz (SiO2) | 14808-60-7 | - | 2.5 | 0.1 |
| | | 8 | 10140045 | Sodium carbonate | 467-19-8 | - | 25.0 | 10.0 |

FIG. 10

AUTOMATED INDEXING AND EXTRACTION OF INFORMATION IN DIGITAL DOCUMENTS

TECHNICAL FIELD

Disclosed automated systems and methods to index information in digital documents, which in various instances rely on trained machine learning networks individually or in combinations with other configured modules, devices, or processes. In particular, this application is directed to automated indexing and extraction of tabulated information in digital documents.

SUMMARY

In numerous aspects, a computer implemented method to automatically index targeted information in a digital document is disclosed. The method comprises selecting a page number of a digital document to identify a page containing targeted information; inputting an image of the page into a visual machine learning network (visual ML), wherein the visual ML is trained to recognize text associated with the targeted information in an image; identifying by the visual ML, a section of the image that contains the targeted information; inputting the page number, the digital document, and coordinates of the section into an extraction module; and extracting the targeted information by the extraction module from the section.

In numerous aspects, a system is disclosed, comprising at least one processor; and at least one non-transitory, computer-readable memory storing instructions that, when executed by the at least one processor, are effective to selecting a page number of a digital document to identify a page containing targeted information; inputting an image of the page into a visual machine learning network (visual ML), wherein the visual ML is trained to recognize text associated with the targeted information in an image; identifying by the visual ML, sections of the image that contain the targeted information; inputting the page number, the digital document, and coordinates of the sections into an extraction module; extracting the targeted information by the extraction module from the sections; inputting the extracted targeted information into a natural language processing ML network (NLP); and identifying at least one data item, by the NLP, based on a structure of the extracted targeted information.

In numerous aspects, a method to train machine learning networks to autonomously identify targeted information, the method comprising parsing a custom dataset containing texts of digital documents to produce a string of characters; identifying portions in the string of characters containing information; splitting the string of characters into tokens; training a natural language processing ML network (NLP), the training comprising inputting the tokens into the NLP model; and outputting by the NLP model, identifications comprising a first word of a chemical ingredient name, a subsequent word of a chemical ingredient name, or a word not belonging to any chemical ingredient name.

BRIEF DESCRIPTION OF THE DRAWINGS

In the description, for purposes of explanation and not limitation, specific details are set forth, such as particular aspects, procedures, techniques, etc. to provide a thorough understanding of the present technology. However, it will be apparent to one skilled in the art that the present technology may be practiced in other aspects that depart from these specific details.

The accompanying drawings, where like reference numerals refer to identical or functionally similar elements throughout the separate views, together with the detailed description below, are incorporated in and form part of the specification, and serve to further illustrate aspects of concepts that include the claimed disclosure and explain various principles and advantages of those aspects.

Figure 1:
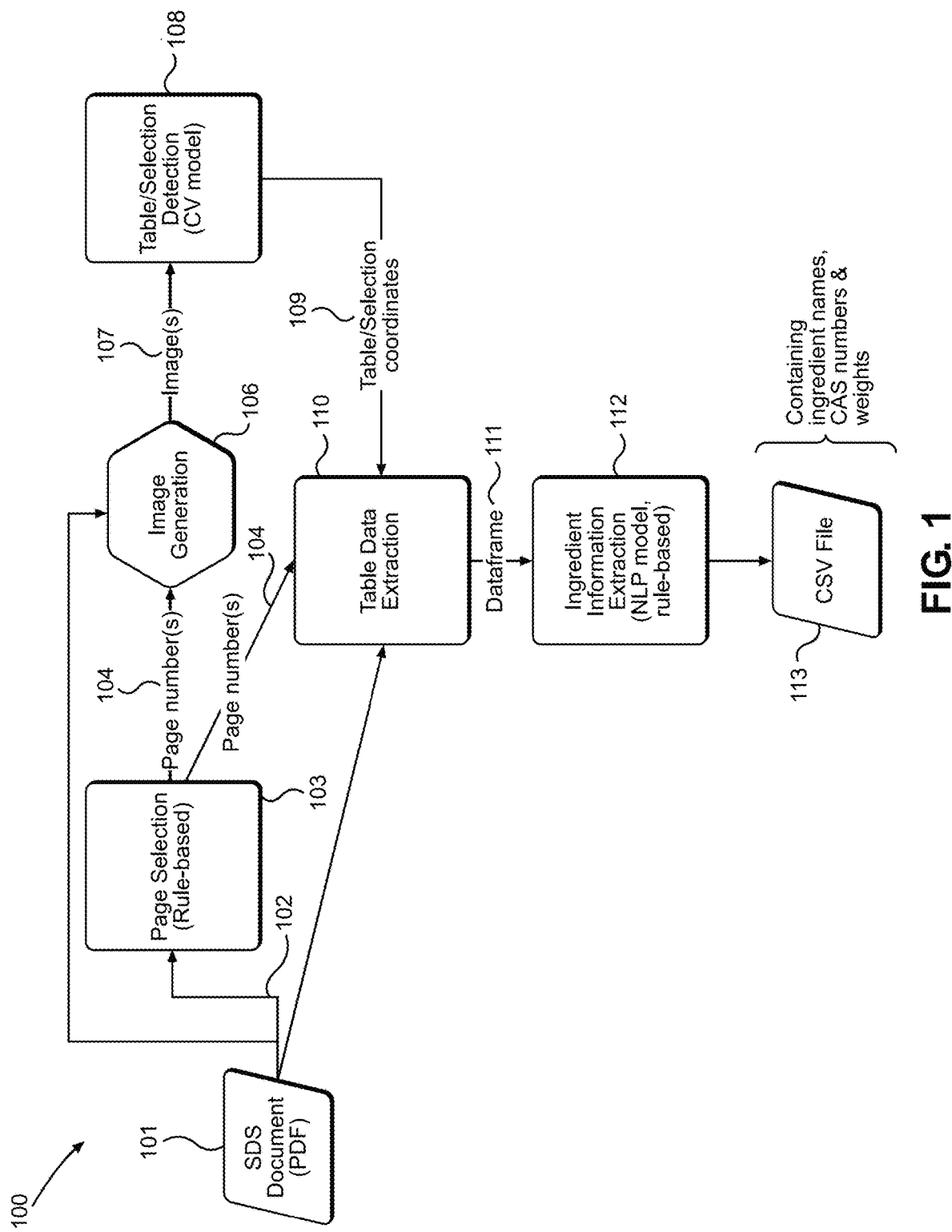

The systems, and methods disclosed herein have been represented where appropriate by conventional symbols in the drawings, showing only those specific details that are pertinent to understanding the various aspects of the present disclosure so as not to obscure the disclosure with details that will be readily apparent to those of ordinary skill in the art having the benefit of the description herein.

FIG. 1 illustrates a flow chart of one aspect of a method to automatically index and extract tabulated information in a document, according to at least one aspect of the present disclosure.

Figure 2:
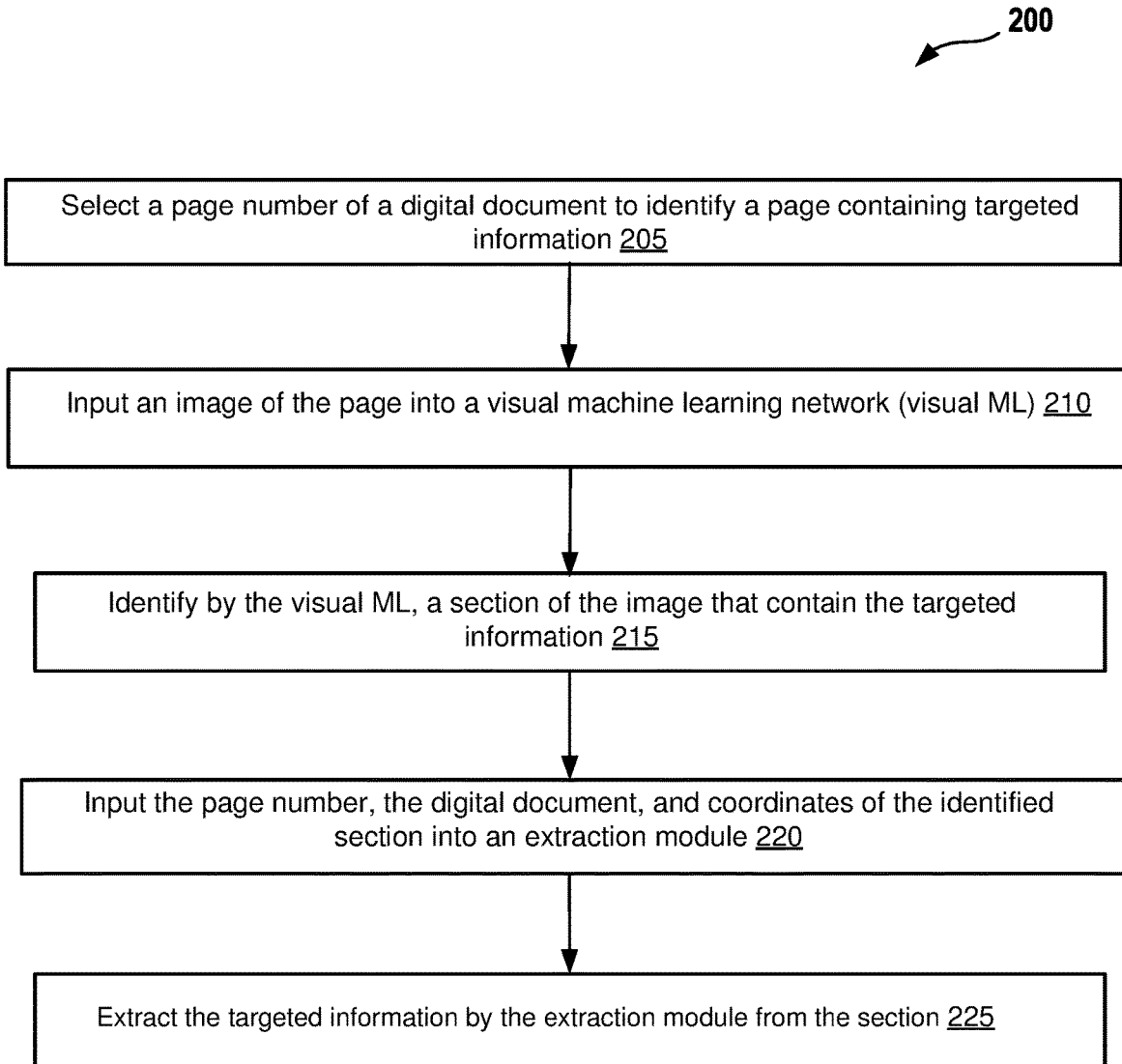

FIG. 2 illustrates a flow diagram of one aspect of a method to automatically index targeted information in a digital document, according to at least one aspect of the present disclosure.

Figure 3:
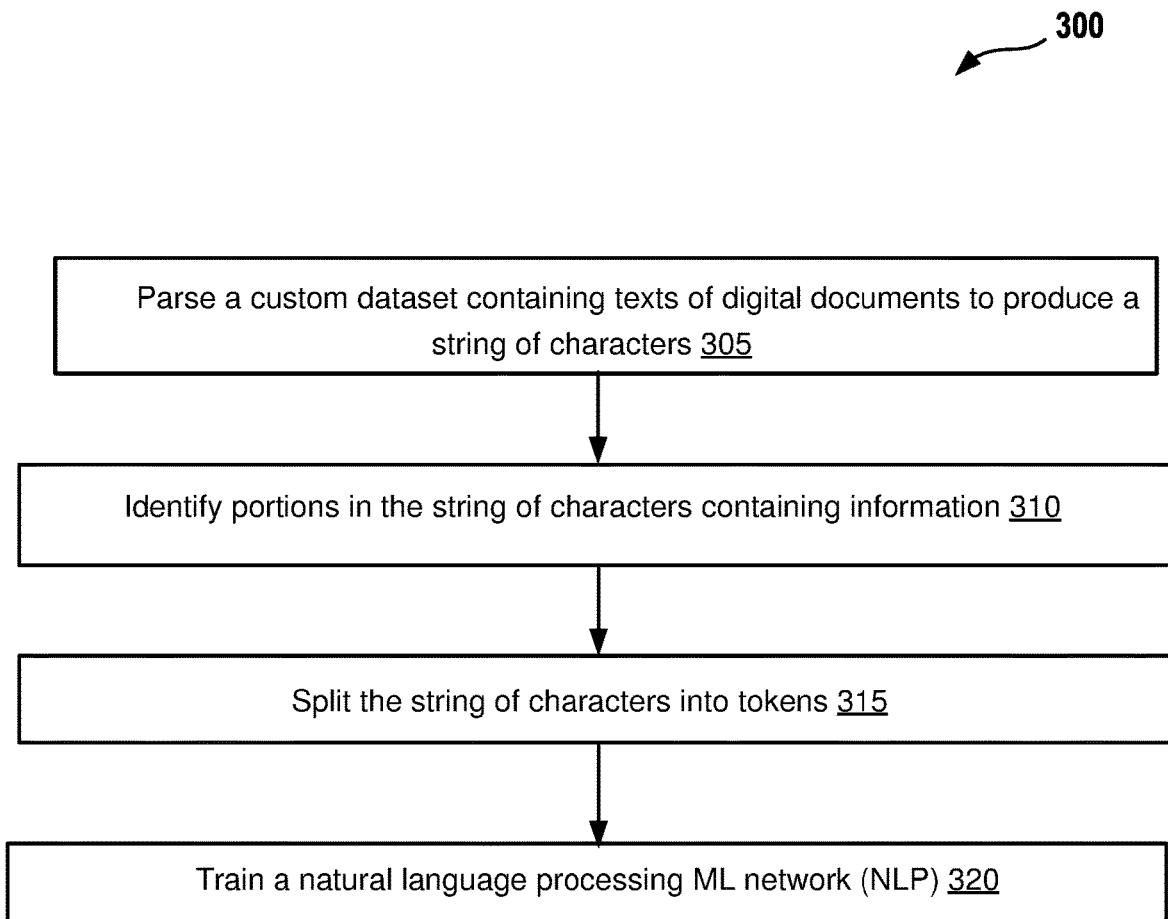

FIG. 3 illustrates a flow chart of one aspect of a method to train multiple types of machine learning networks to autonomously identify targeted information, according to at least one aspect of the present disclosure.

Figure 4:
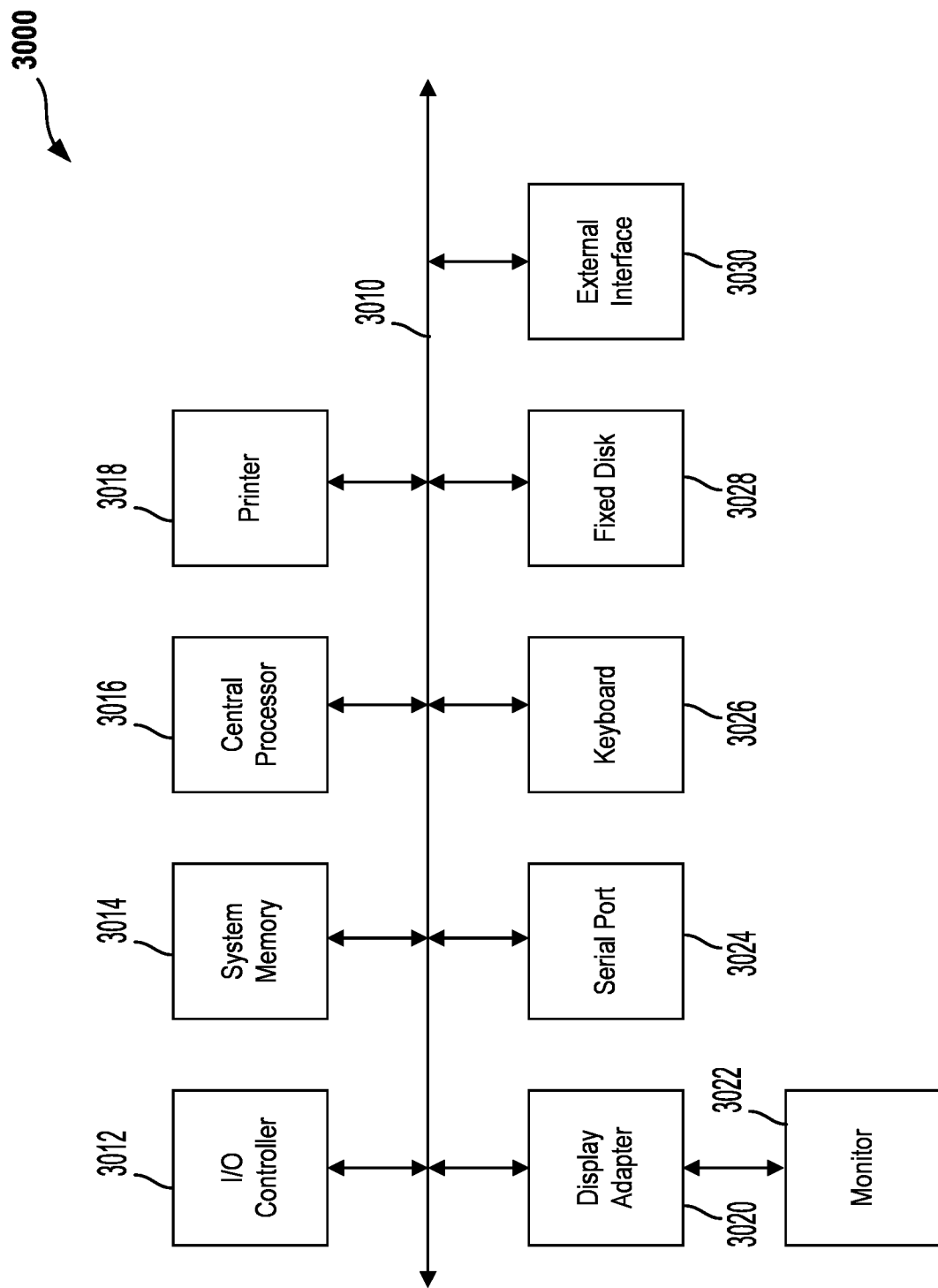

FIG. 4 presents a block diagram of a computer apparatus, according to at least aspect of the present disclosure.

Figure 5:
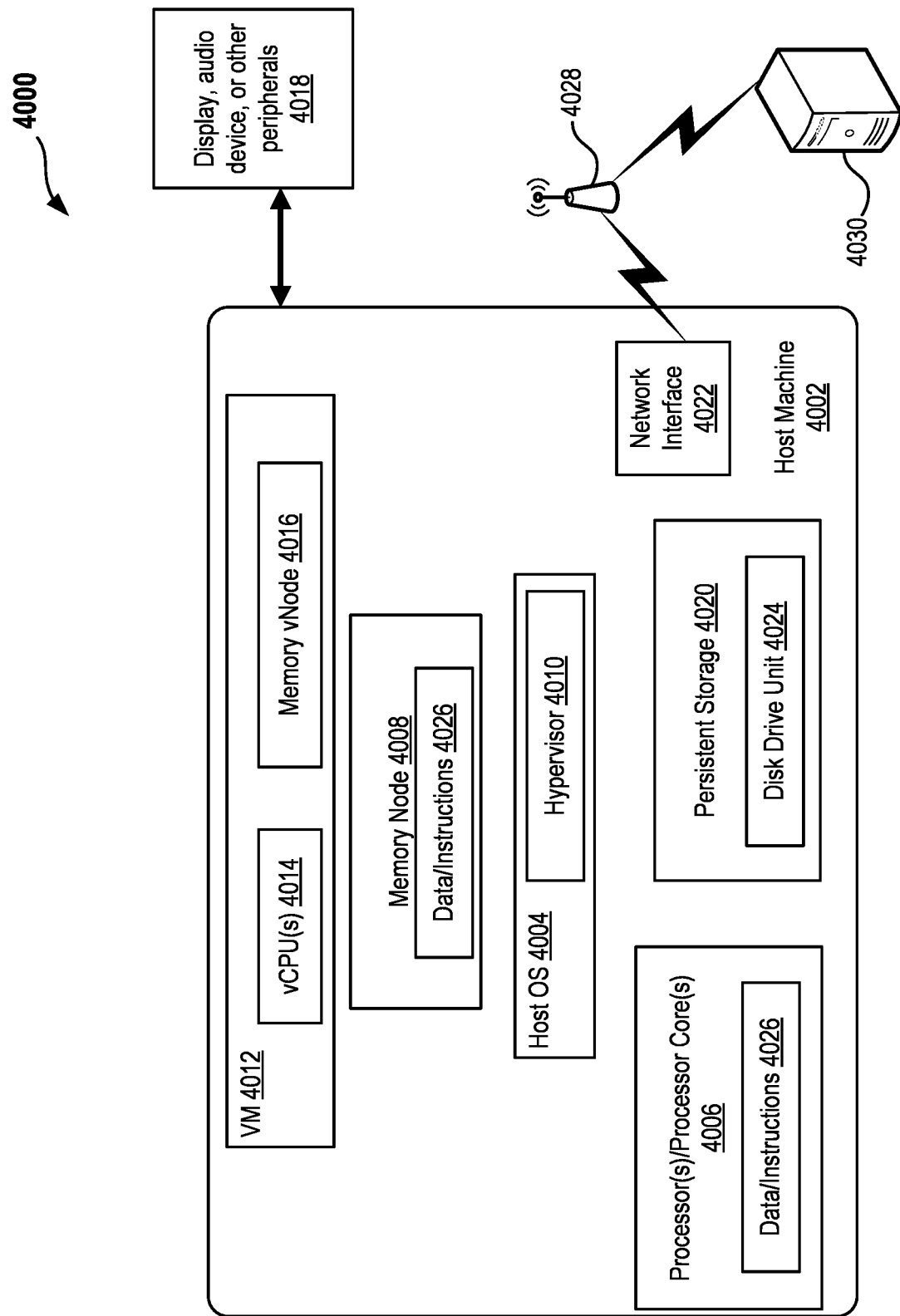

FIG. 5 is a diagrammatic representation of an example system that includes a host machine within which a set of instructions to perform any one or more of the methodologies discussed herein may be executed, according to at least one aspect of the present disclosure.

Figure 6:
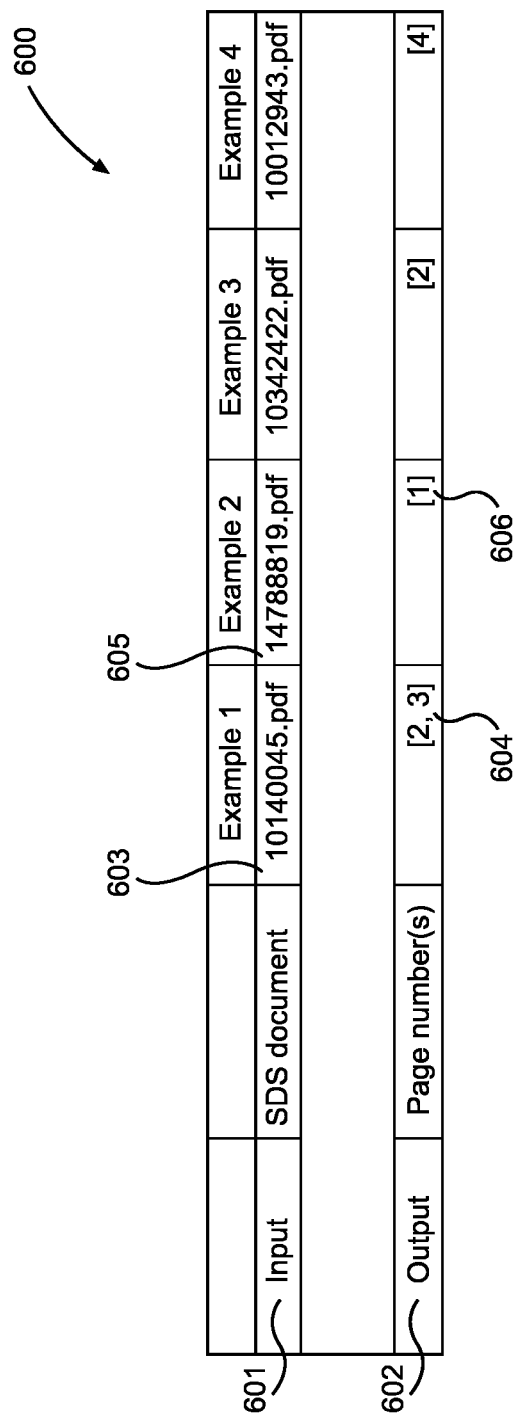

FIG. 6 illustrates one example of the inputs and outputs of automated page selection from a digital document, according to at least one aspect of the present disclosure.

Figure 7A:
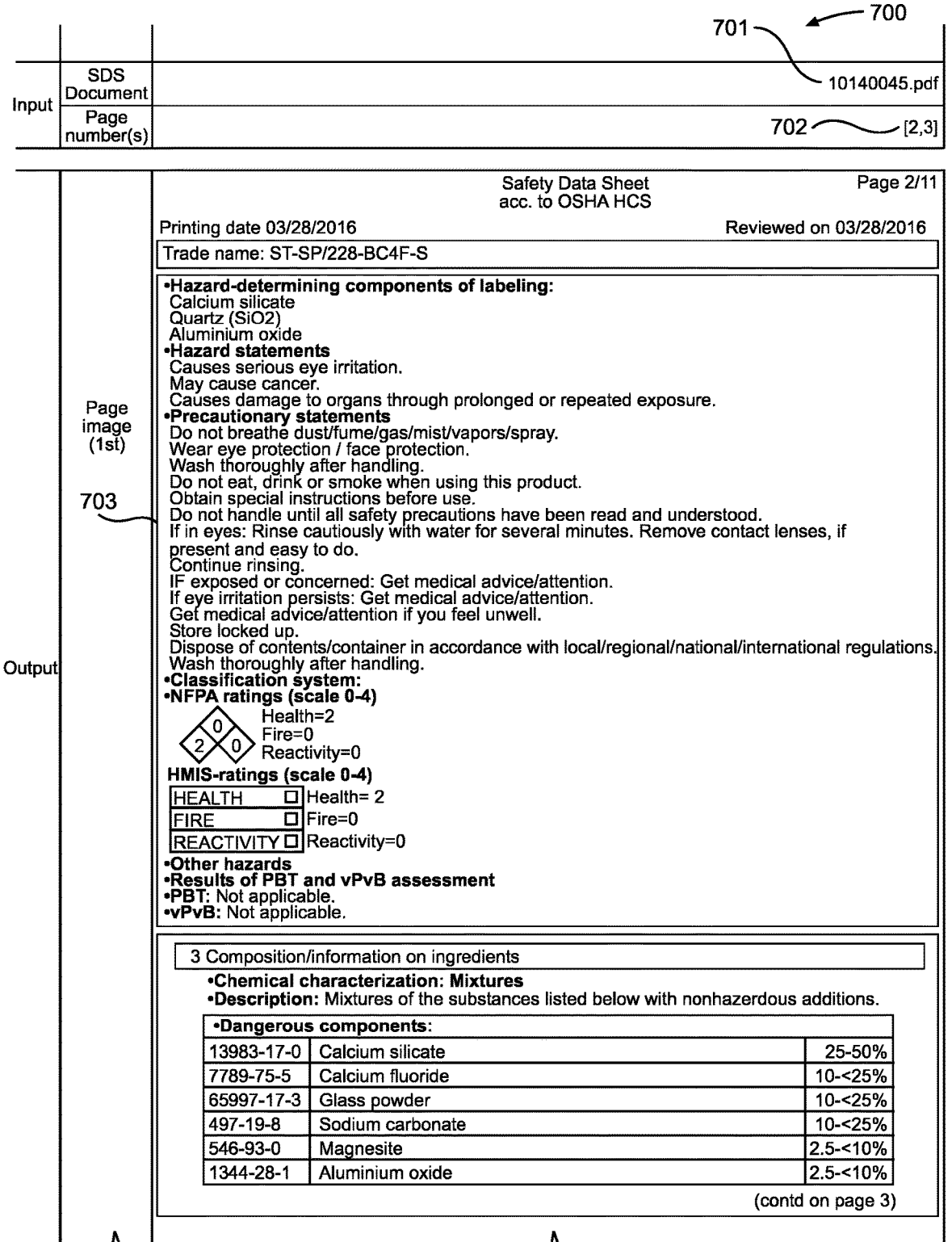

FIG. 7A-7B illustrate one example of the inputs and outputs of image generation from a digital document, according to at least one aspect of the present disclosure.

FIG. 8 illustrates one example of the inputs and outputs of extraction of sections of an image, according to at least one aspect of the present disclosure.

FIG. 9 illustrates one example of the inputs and outputs of extraction of data, information, or text from extracted portions of an image, according to at least one aspect of the present disclosure.

FIG. 10 illustrates one example of the inputs and outputs of extraction of data, information, or text from extracted portions of an image, according to at least one aspect of the present disclosure.

DESCRIPTION

Before discussing specific embodiments, aspects, or examples, some descriptions of terms used herein are provided below.

As used herein, the term "computing device" or "computer device" may refer to one or more electronic devices that are configured to directly or indirectly communicate with or over one or more networks. A computing device may be a mobile device, a desktop computer, and/or the like. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. The computing device may not be a mobile device, such as a desktop computer. Furthermore, the term "computer" may refer to any computing device that includes the necessary components to send, receive, process, and/or output data, and normally includes a display device, a processor, a memory, an input device, a network interface, and/or the like.

As used herein, the term "server" may include one or more computing devices which can be individual, stand-alone machines located at the same or different locations, may be owned or operated by the same or different entities, and may further be one or more clusters of distributed computers or "virtual" machines housed within a datacenter. It should be understood and appreciated by a person of skill in the art that functions performed by one "server" can be spread across multiple disparate computing devices for various reasons. As used herein, a "server" is intended to refer to all such scenarios and should not be construed or limited to one specific configuration. The term "server" may also refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible.

Reference to "a device," "a server," "a processor," and/or the like, as used herein, may refer to a previously recited device, server, or processor that is recited as performing a previous step or function, a different server or processor, and/or a combination of servers and/or processors. For example, as used in the specification and the claims, a first server or a first processor that is recited as performing a first step or a first function may refer to the same or different server or the same or different processor recited as performing a second step or a second function.

As used herein, the term "system" may refer to one or more computing devices or combinations of computing devices (e.g., processors, servers, client devices, software applications, components of such, and/or the like).

The rise of the digitization of documents across all platforms and industries, and the movement away from manual indexing, identification, and sorting of paper-based documents has led to various technological solutions to parse, analyze, index, or extract information from digital documents. However, none of currently available technological solutions are able to identify, index, and extract targeted and complex information from a digitized document based on what the user desires, especially if the text is highly variable and contains unpredictable features. While searching or matching key words or phrases in digital documents is common, indexing targeted complex information is difficult when using different types of documents, for example text or image-based documents, and where the information is within various different structures, for examples within tables, under sections, in cells, free text and the like. The combination of all these factors makes it difficult for autonomous technical solutions to be able to index sought or targeted information by a user.

Specific sought or targeted complex information may be related to a specific industry. For example, product manufacturing compliance regulatory landscapes have become increasingly stringent, driving chemical producers, distributors, and users to align their practices more with the principles of green chemistry, with an aim to reduce or eliminate the use or generation of hazardous substances across the life cycle of a chemical product. A system to manage and access such information relies on information available in safety data sheets (SDS) that may be in a digitized format. However the complex nature of chemical ingredient information, and the fact that chemical ingredients and compositions are made up of various structures, alphanumeric characters, symbols, and associations with various variables and factors, as well as the fact that such information in safety data sheets is structured in various different ways, and is highly variable, for example, target information may fall under specific sections, or within tables that could exist anywhere on these SDSs, makes it technically very difficult to automate the indexing of these documents, identify relevant information, extract or analyze target information.

Furthermore, a rule-based or solely rule-based information extraction and identification system is not sufficient in complex industries and for complex documents, such as SDS documents produced by stakeholders in the chemical industry. This could for example be because each product manufacturer follows its own template and design for its SDS or digital document. For certain manufacturers, this information may be presented in a non-complex or in a straightforward manner, while for many others it may be in a complex and diverse manner. The inconsistencies across manufacturers and the need to extract information from an SDS that may be a combined document produced as a result of collaboration by multiple actors or manufacturers dictates the need to have an intelligent machine learning system capable of extracting and identification system.

Disclosed herein are systems and methods that provide a technical solution to automate indexing, extracting, and identifying targeted information in complex structures in documents, and scaling this automation to be usable for large volumes of complex documents, including digital documents such as SDSs. An SDS document usually covers a chemical product, its name, and various details. The SDS is generally divided into multiple sections, usually 16, where a chemical ingredient or composition section is present in one of the sections. A chemical product covered by the SDS may be composed of a single ingredient that may be arranged in a tabular format.

In one aspect an automated system to index the composition information of products from Safety Data Sheets is presented. The system specifically indexes the ingredient names and their corresponding Chemical Abstracts Service (CAS) numbers and weight percentages. The number of ingredients in a chemical product and the presence or absence of the corresponding CAS numbers and weight percentages are unknown variables of the composition, and the system is designed to handle that variability. The system takes the SDS document (e.g., in PDF format) as the input and gives the list of ingredient names along with their corresponding CAS numbers and weight percentages in a tabular format as the output, which can be stored in a database or a file. In several aspects, the ingredient names and other details are structured in tabular format in the SDS documents. The system uses a combination of Machine Learning techniques (Computer Vision and Natural Language Processing) and rule-based systems that may be undertaken serially.

FIG. 1 illustrates a flow chart of one aspect of a system to automatically index and extract tabulated information in a document, according to at least one aspect of the present disclosure. System 100 may facilitate information to be requested or sought from a document 101, which may be a digital document, of a text or image format, such as a PDF.

Document 101 may also be an SDS. Document 101 may be text or image based. A user seeking specific information in document 101 (this sought specific information is also referred to herein as "targeted information" or "target information") may input document 101 into a page selection module 103 that may execute one or more processes or threads, or be comprised of multiple other components or modules to select or identify one or more pages in document 101 where the targeted information resides. In various embodiments, page selection module 103 may be comprised of various disparate processes, which may be undertaken on an individual device, or on multiple devices, that select at least one page containing target information.

Page selection module 103 may in various aspects, be configured to identify page(s) within a document 101 that contains target information, for example chemical composition information in an SDS, and select these page(s), to be included in a list for example of all identified page numbers. In several aspects, to identify or select a page document 101 is parsed to extract the text from the document using extraction software such as PDF extraction software. In some aspects, this extracted text is cleaned and passed as a string of characters, alphanumerical text, and/or numbers to another stage in a pipeline or process executed by page selection module 103.

To identify a page in document 101 with target information, a combination of rules designed to determine the beginning and end sections in the text/string of characters, along with the presence of targeted information is used. This may include a combination of rules to identify composition of chemical ingredient information in document 101, when it is an SDS, along with the presence of the relevant ingredient information within an identified section. In particular, regular expressions, or expression matching may be used to identify section headers, chapters, and other identifiers of different sections in the text or strings of document 101. Regular expressions or expression matching may also be used to detect particular numbers or numerical patterns, or patterns of numbers, for example CAS numbers. Expression matching can also be used to detect known words, expressions, or phrases such as ingredient labels. All these various forms of expression matching may be used to identify various components of document 101.

Page selection module 103 may also contain a machine learning component. The machine learning ("ML") network may be a natural language processing ("NLP") machine learning model trained to detect specific names, words, symbols, phrases, alphanumerical combinations, or expressions. In one example the NLP model may be trained to detect the presence of chemical ingredient names. In one aspect, the NLP model used is a pre-trained Bidirectional Encoder Representations from Transformers (BERT) Named Entity Recognition (NER) model, fine-tuned on a custom dataset. In several examples the custom dataset may contain texts of the composition section of SDS documents. The model takes the text split into tokens as the input and is designed to identify three categories of tokens: a first word in a name, phrase, or expression, for example, the first word of the chemical ingredient name, the subsequent words of the name, phrase, or expression, such as a chemical ingredient name, and the words not belonging to the name, phrase or expression, such as the chemical ingredient name. In this step, the system uses the model to look for the presence of any tokens belonging to name, phrase, or expression, such as the example chemical ingredient name.

If the expression matching and/or NLP model fail to identify target information, for example chemical ingredient information, names, or compositions of chemicals in SDS documents or document 101, then pre-determined or pre-set rules may be used or autonomously implemented by the module 103 to find target information. Rules may be designed and configured for various configurations or documents. Depending on the target information sought, or the structure of the information, for example being in a table or unstructured text, or a list or otherwise, the rules that are implemented by page selection module may be altered accordingly. An example of rules that could be applied when target information includes chemical ingredient information may be rules configured to determine or check if the beginning and end of a chemical composition section is on the same page. If the text between the sections contains the relevant ingredient information, the page is added to the list for pages to be selected by module 103.

A pre-configured rule may also include to check or determine if only the beginning of a section is found on any page. If the text after this point contains the target information, such as relevant ingredient information, the page is added to the list of correct pages. A rule may also determine or check if only the end of a section is found on any page. If the text before this point contains the relevant or target information, for example ingredient or chemical information, the page is added to the list of correct pages. Finally, if all these fail, then a fall back search or one-off very specific identification matching query may be run, for example if no correct pages are identified, the module 103 determines or checks if a specific number or numerical pattern is present in a specific section, such a fallback rule may include determining if a CAS number is present in section 1 of a document 101. If yes, then page 1 is the correct page and is selected. Any combination of the methods and processes described above may be used by page selecting module 103 or by individual processes or devices to select a page with target information in document 101.

Once a page(s) is selected, in various aspects, the selected pages by module 103 are input into an image generation module 106 where image 107 is generated of each selected page. System 100 may continue by identifying location of sections, or depending on the type of document 101, a table, chart, list or other form of structured information or data, sought or other configuration specifying the type of data or data structure sought. In one aspect, a data structure or section identification module 108 may be or include a machine learning model component, for example a Computer Vision ("CV") machine learning network trained for the purpose. The CV model may in several instances be a pre-trained Cascade Mask R-CNN object detection model, fine-tuned on a custom dataset containing images of SDS documents.

In several aspects the output of section identification module 108, or a component of it, for example CV network or model, receives an input of the image(s) 107 that was generated, for example by the image generation module 106, detects the structure with the target information, or the relevant section of the target information and outputs coordinates 109 of the sections in the image containing the target information. If the CV machine learning network or model is unable to identify the location or coordinates of sections containing target information, either because it fails to do so or because the data is not structured in the way the model was trained to detect, this could occur for example if a CV model is trained to detect tables or data in tables, but the information or data was not in a table but in another format such as sections, or free-flowing text. In these cases, coordinates 109 of sections containing the target information may be obtained by running optical character recognition (OCR) in addition to a combination of pre-set rules, which may be identical or at least similar to those applied by module 103 to identify target information in order to select the page. The coordinates 109 are in either case used as inputs in other parts of system 100.

System 100 may also comprise a table data or section extraction module 110 which relies on the input coordinates 109 to extract the tables from the provided image. In several aspects, document 101, identified or selected page numbers 104 in addition to coordinates 109 are input into a process pipeline or a table data or section extraction module 110 which by using the input coordinates 109 along with selected page numbers 104 may extract target information from the correction sections of the pages corresponding to the selected page numbers 104 of document 101. This extracted information may then be the output of the extraction module 110. In some aspects, the table data or section extraction module 110 extracts the target information in its original structure, as extracted data 111. In various aspects for example, a tabular structure is extracted and then converted into a 2D data structure such as a dataframe. In other embodiments the whole section or tabular structure is extracted as extracted data 111. In several embodiments the target information is directly extracted as extracted data 111 from the ascertained coordinates 109 and pages 104 from document 101.

System 100 may then retain the structure of the target information in extracted data 111 as a 2D dataframe or in another data structure format. The extracted data 111 is then input into a target information extraction module 112 that in various aspects maybe configured to be a chemical ingredient data extraction module. In several aspects the target information extraction module 112 outputs target information as data 113, which could be in any type of file, including a .csv file format. In numerous aspects, the extracted data 111 retains the tabular structure, which is used in the subsequent step to identify weight percentages of chemicals and to use these known associations between different parts of extracted data 111, for example the chemical names, CAS numbers, and weight percentages. This could for example be done by associating the weight percentages of chemicals to associate with previously identified or extracted weigh percentages.

System 100 may remove noise from extracted data 111, which may include steps to clean textual data. Associations in the cleaned data may then be used to identify specific target information by the target information extraction module 112. For example, if the system 100 is directed towards extracting and obtaining chemical ingredient information, it may use known associations between the data to determine ingredient names along with the corresponding CAS numbers and weight percentages. Alternatively, there may be no known associations, but associations are identified at the tabular structure, or other data structure, generally within the area of the identified page(s) that the CV model has selected. The extraction module may be comprised of an NLP Machine learning model, which may be the same or a different NLP model to the one used to select pages on in page selection module 103. In several aspects the NLP model may be a BERT NER model that identifies specific text, expressions, names, or phrases, for example chemical ingredient names in extracted data 111.

Tokens may be generated or the tokens generated at the page selecting process may be reused, for example, the text is split into three categories of tokens: the first word of a name, or phrase, such as a chemical ingredient name, the subsequent words of the name or phrase, such as the chemical ingredient name, and the words not belonging to the name or phrase, such as a chemical ingredient name. System 100 uses the model to look for the presence of any tokens belonging to a name or phrase such as a chemical ingredient name. The NLP model may make predictions for each token of the text individually, and additional post-processing rules are used to get the full names, such as a full name of a chemical ingredient instead of just abbreviations or symbols.

The table or data structure that was extracted may be scanned by system 100 or the NLP model to look for target name and identify the rows and columns containing them. Some columns may contain other information that are associated with the target names or phrases being sought, in the example of SDS documents, the columns (or rows in some aspects) containing CAS numbers and weight percentages are identified using regular expressions, or expression matching and the tabular structure of the data is used to determine an association between the chemical names, CAS numbers, and weight percentages. Multiple other associations or associated information may be inferred, determined or extracted from the information in the columns or rows. In the SDS document example, the regular expressions for CAS numbers are also designed to identify non-numerical values like trade secrets, mixture information and the like. The final output 113 is a 2D structure where each row corresponds to an ingredient, and the columns correspond to the different pieces of information belonging to an ingredient. This can be stored in a structured database or a file 113.

FIG. 2 illustrates a flow diagram of one aspect of a method 200 to automatically index targeted information in a digital document, according to at least one aspect of the present disclosure. With reference now primarily to FIG. 2 together with FIG. 1, in one aspect, method 200 may commence by selecting 205 a page number of a digital document, for example document 101, FIG. 1 to identify a page containing targeted information. This in many aspects could occur for example via a page selecting module 103, FIG. 1. The page corresponding to the selected page number may then be input 210 as an image into a visual machine learning network (visual ML), and/or into a visual detection module, for example section identification module 108, FIG. 1. The visual ML may identify 215 a section of the image that contains the targeted information, the section may be identified by coordinates. Method 200 may then continue to input 220 the page number, the digital document, and the coordinates of the identified section in an extraction module, for example table data or section extraction module 110, FIG. 1. The extraction module may then extract 225 the targeted information from the section that was identified 215. In various aspects any of the processes, systems, or methods in system 100, FIG. 1 may be combined with method 200, and in any order or combination.

In several aspects, method 200 may also comprise inputting the extracted targeted information into a natural language processing ML network (NLP), that may for example be part of module 112, FIG. 1, and identifying at least one data item, by the NLP network, based on a structure of the extracted targeted information. The data item may be of any type, and in the context of SDS documents may include for example chemical names, CAS numbers, and chemical structure weights. Similar to the system 100, FIG. 1, the selecting 205 of a page number may be comprised of various processes and depending on the aspect may comprise parsing the digital document to produce a string of characters and then identifying relevant portions in the string of characters containing the targeted information. Furthermore, the identification of these relevant portions may itself comprise splitting the produced string of characters into tokens which are input into a natural language processing ML network (NLP), and then identifying by the NLP at least one of a first word of a chemical ingredient name, a subsequent word of a chemical ingredient name, or a word not belonging to any chemical ingredient name.

In instances where the NLP fails to identify these names, then specific predetermined rules may be implemented to select page numbers containing targeted information. For example, these rules could include adding a page number to a list, once the system determines that both a beginning part and an end part of a relevant portion are on the same page. In other instances, a page number may be added to a list, if the system determines that a beginning part of a relevant portion is on a page, but not the end part of the relevant portion, and that the targeted information is on a subsequent page to the beginning part or section. A page number may also be added to a list if the end part of a relevant portion but not the beginning part is on a page, and the targeted information is on a previous page to the end part. Alternatively, if a specific number, for example a CAS number or other symbol or alphanumerical combination is on a page, the system may add that page to a list of relevant pages.

In several aspects, the relevant pages may include sections that have section headers, specific numbers, alphanumeric combinations, or keywords, wherein the identification is undertaken via expression matching in the string of characters. In several embodiments when a page number is identified, then an image is generated of the page corresponding to the page number in the document. This image may then be used as an input for example in a table or section detection module 108, FIG. 1.

FIG. 3 illustrates a flow chart of one aspect of a method to train multiple types of machine learning networks to autonomously identify targeted information, according to at least one aspect of the present disclosure. In one aspect, method 300 commences with parsing 305 a custom dataset containing texts of digital documents to produce a string of characters. The custom dataset may be one curated specifically to train a machine learning network to identify specific information. For example, when training a machine learning network such as an NLP model to determine chemical names, CAS numbers, weightings and other information related to chemical ingredients, the custom dataset may be comprised of numerous SDS documents. Method 300 may then continue by identifying 310 portions in the string of characters containing information, and then split 315 the string into tokens that are then fed into a machine learning network for training. The processes 305-315 may be considered as preprocessing data in method 300 to prepare the training dataset. The machine learning network, which is an NLP model is then trained 320 by the tokens input into it. The training may comprise inputting the tokens into the NLP model; and outputting by the NLP model, a label for each of the tokens are identified or classified into a category. In one example embodiment, there may be three categories, and the token is categorized or classified into one of them. Example classifications or categories of tokens may be a first word of an ingredient name, subsequent word of an ingredient name, or not belonging to an ingredient name.

In several aspects, method 300 may continue with training a visual machine learning network (visual ML) such as a CV model on an image-based dataset, to recognize text or portions/sections of pages or images associated with pertinent information in an image. The pertinent information may be target information, such as chemical ingredient information. The training may comprise inputting image data from an image-based dataset into the visual ML; and outputting coordinates of identified relevant portions containing the pertinent information. The coordinates may include or border sections, tables, or other formatted information that is considered pertinent information. Once both the NLP model and the visual ML model are trained on provided datasets, then these models or networks may be utilized in any of the processes described above in relation to FIGS. 1-2, and in any order or combination.

FIG. 4 is a block diagram of a computer apparatus 3000 with data processing subsystems or components, which a set of instructions to perform any one or more of the methodologies discussed herein may be executed, according to at least one aspect of the present disclosure. The subsystems shown in FIG. 4 are interconnected via a system bus 3010. Additional subsystems such as a printer 3018, keyboard 3026, fixed disk 3028 (or other memory comprising computer readable media), monitor 3022, which is coupled to a display adapter 3020, and others are shown. Peripherals and input/output (I/O) devices, which couple to an I/O controller 3012 (which can be a processor or other suitable controller), can be connected to the computer system by any number of means known in the art, such as a serial port 3024. For example, the serial port 3024 or external interface 3030 can be used to connect the computer apparatus to a wide area network such as the Internet, a mouse input device, or a scanner. The interconnection via system bus allows the central processor 3016 to communicate with each subsystem and to control the execution of instructions from system memory 3014 or the fixed disk 3028, as well as the exchange of information between subsystems. The system memory 3014 and/or the fixed disk 3028 may embody a computer readable medium.

FIG. 5 is a diagrammatic representation of an example system 4000 that includes a host machine 4002 within which a set of instructions to perform any one or more of the methodologies discussed herein may be executed, according to at least one aspect of the present disclosure. In various aspects, the host machine 4002 operates as a standalone device or may be connected (e.g., networked) to other machines. In a networked deployment, the host machine 4002 may operate in the capacity of a server or a client machine in a server-client network environment, or as a peer machine in a peer-to-peer (or distributed) network environment. The host machine 3002 may be a computer or computing device, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example system 4000 includes the host machine 4002, running a host operating system (OS) 4004 on a processor or multiple processor(s)/processor core(s) 4006 (e.g., a central processing unit (CPU), a graphics processing unit (GPU), or both), and various memory nodes 4008. The host OS 4004 may include a hypervisor 4010 which is able to control the functions and/or communicate with a virtual machine ("VM") 4012 running on machine readable media. The VM 4012 also may include a virtual CPU or vCPU 4014. The memory nodes 4008 may be linked or pinned to virtual memory nodes or vNodes 4016. When the memory node 4008 is linked or pinned to a corresponding vNode 4016, then data may be mapped directly from the memory nodes 4008 to their corresponding vNodes 4016.

All the various components shown in host machine 4002 may be connected with and to each other or communicate to each other via a bus (not shown) or via other coupling or communication channels or mechanisms. The host machine 4002 may further include a video display, audio device or other peripherals 4018 (e.g., a liquid crystal display (LCD), alphanumeric input device(s) including, e.g., a keyboard, a cursor control device, e.g., a mouse, a voice recognition or biometric verification unit, an external drive, a signal generation device, e.g., a speaker,) a persistent storage device 4020 (also referred to as disk drive unit), and a network interface device 4022. The host machine 4002 may further include a data encryption module (not shown) to encrypt data. The components provided in the host machine 4002 are those typically found in computer systems that may be suitable for use with aspects of the present disclosure and are intended to represent a broad category of such computer components that are known in the art. Thus, the system 4000 can be a server, minicomputer, mainframe computer, or any other computer system. The computer may also include different bus configurations, networked platforms, multi-processor platforms, and the like. Various operating systems may be used including UNIX, LINUX, WINDOWS, QNX ANDROID, 10S, CHROME, TIZEN, and other suitable operating systems.

The disk drive unit 4024 also may be a Solid-state Drive (SSD), a hard disk drive (HDD) or other includes a computer or machine-readable medium on which is stored one or more sets of instructions and data structures (e.g., data/instructions 4026) embodying or utilizing any one or more of the methodologies or functions described herein. The data/instructions 4026 also may reside, completely or at least partially, within the main memory node 4008 and/or within the processor(s) 4006 during execution thereof by the host machine 4002. The data/instructions 4026 may further be transmitted or received over a network 4028 via the network interface device 4022 utilizing any one of several well-known transfer protocols (e.g., Hyper Text Transfer Protocol (HTTP)).

The processor(s) 4006 and memory nodes 4008 also may comprise machine-readable media. The term "computer-readable medium" or "machine-readable medium" should be taken to include a single medium or multiple medium (e.g., a centralized or distributed database and/or associated caches and servers) that store the one or more sets of instructions. The term "computer-readable medium" shall also be taken to include any medium that is capable of storing, encoding, or carrying a set of instructions for execution by the host machine 4002 and that causes the host machine 4002 to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example aspects described herein may be implemented in an operating environment comprising software installed on a computer, in hardware, or in a combination of software and hardware.

One skilled in the art will recognize that Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized to implement any of the various aspects of the disclosure as described herein.

The computer program instructions also may be loaded onto a computer, a server, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 4030 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the host machine 4002, with each server 4030 (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one aspect of a bus. Transmission media can also take the form of acoustic or light waves, such as those generated during radio frequency (RF) and infrared (IR) data communications. Common forms of computer-readable media include, for example, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASH EPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object-oriented programming language such as Java, Smalltalk, C++, or the like and conventional procedural programming languages, such as the "C" programming language, Go, Python, or other programming languages, including assembly languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Examples of the method according to various aspects of the present disclosure are provided below in the following numbered clauses. An aspect of the method may include any one or more than one, and any combination of, the numbered clauses described below.

FIG. 6 illustrates one example of the inputs and outputs of automated page selection from a digital document, according to at least one aspect of the present disclosure. With reference now primarily to FIG. 6 together with FIG. 1-2, examples 600 include inputs 601 and outputs 602 which may be input into page selection 103, FIG. 1 or selection of page number 205, FIG. 2. The outputs are produced by page selection 103, FIG. 1 or selection of page number 205, FIG. 2. For example, inputs 603, and 605 may be any type of digital document such as an SDS document, and may in in various document formats, for example PDF. The page number or output 602 provides the page numbers with relevant or target information of inputs 601. The output 604 of document 603 contains two page numbers as more than one page number is identified as containing target or relevant information. Document 605 however, only contains one page that is identified as containing relevant or target information and therefore output 606 contains a reference to only one page number.

FIG. 7A-7B illustrates one example of the inputs and outputs of image generation from a digital document, according to at least one aspect of the present disclosure. With reference now primarily to FIG. 7A-7B together with FIGS. 1-2 and 6, example 700 may input an extracted document 701 and page numbers 702, which may correspond to document 603, and identified output page numbers 604, FIG. 6. In this example the identified page numbers 702 as pages [2,3] of document 701, this information, including the page numbers may be equivalent to page number 104, FIG. 1 for example. These page numbers may therefore be input 210, FIG. 2 into an image generation process or module 106, FIG. 1 along with document 101, FIG. 1 which corresponds to document 701. Image generation process or module 106, FIG. 1 may then output images 107, FIG. 1, which correspond to images 703 and 704. In this example two page numbers 702 are identified, and therefore images of two separate pages are produced. However in other examples where only one page is identified then only one image of that particular page is generated.

FIG. 8 illustrates one example of the inputs and outputs of a detection of sections, tables, or portions of the image(s), according to at least one aspect of the present disclosure. With reference now primarily to FIG. 8 together with FIGS. 1-2, and 7-8, example 800 may include inputs of page images 703, 704, FIG. 7A-7B that were generated at example 700 or 106, FIG. 1 for example. These image inputs are fed into a CV model 108, FIG. 1, so that the model 108 may detect the relevant sections in the images. The output of CV model 108, FIG. 1 may be separate/independent outputs for each page image 703, 704 that is input into CV model 108. For example, for page image 703 the output coordinates CV model 108 are coordinates 801 of a relevant section, in this example an identified table 802, containing relevant chemical information.

FIG. 9 illustrates one example of the inputs and outputs of extraction of sections of an image, according to at least one aspect of the present disclosure. With reference now primarily to FIG. 9 together with FIGS. 1-2, and 7-8, example 900 may include various inputs 901 that are input 220, FIG. 2 or provided to a table or section extraction module 110 such as a pdf extraction module, which may extract an area, for example area 802, or 804, FIG. 8 from a generated image, for example image 703, or 704, FIG. 7A-7B The various inputs may include the document 901, 101, page numbers 902, 903, 104 and images 703, 704, FIG. 7A-7B and 107, FIG. 1, as well as coordinates 903, 904, 109, FIG. 1 that may be derived from CV model 108, FIG. 1. The output(s) 905, 906 may comprise of a dataframe 111, FIG. 1 such as a table that is extracted 225, FIG. 2 by the extraction module. The table may contain text, numbers or other information such as names, compositions, weights, and percentages.

FIG. 10 illustrates one example of the inputs and outputs of extraction of data, information, or text from extracted portions of an image, according to at least one aspect of the present disclosure. With reference now primarily to FIG. 10 together with FIGS. 1-2, and 9, example 1000 may include an input 1001, 1002 which may contain extracted tables, or sections from one or more images, these inputs 1001, 1002 may correspond to dataframe 111, FIG. 1, that were produced as outputs 905, 906, FIG. 9. Once these inputs 1001, 1002 are provided to a target information extraction module 112, FIG. 1, then information or data 1003 may be output, which may include names, compositions, weights, numbers, or percentages as examples.

Examples of the methods and systems according to various aspects of the present disclosure are provided below in the following numbered clauses. An aspect of the method or system may include any one or more than one, and any combination of, the numbered clauses described below.

Clause 1. A computer implemented method to automatically index targeted information in a digital document, the method comprising selecting a page number of a digital document to identify a page containing targeted information; inputting an image of the page into a visual machine learning network (visual ML), wherein the visual ML is trained to recognize text associated with the targeted information in an image; identifying by the visual ML, a section of the image that contains the targeted information; inputting the page number, the digital document, and coordinates of the section into an extraction module; and extracting the targeted information by the extraction module from the section.

Clause 2. The method of Clause 1, further comprising inputting the extracted targeted information into a natural language processing ML network (NLP); and based on the presence of at least one data item in the extracted targeted information, identifying at least one data item, by the NLP model, based on a structure of the extracted targeted information.

Clause 3. The method of any of Clauses 1-2, wherein the selecting comprises parsing the digital document to produce a string of characters; and identifying relevant portions in the string of characters containing the targeted information.

Clause 4. The method of any of Clauses 1-3, wherein the identifying of the relevant portions comprises splitting the string of characters into tokens; inputting the tokens into a natural language processing ML network (NLP); and identifying by the NLP a first word of a chemical ingredient name, a subsequent word of a chemical ingredient name, or a word not belonging to any chemical ingredient name.

Clause 5. The method of any of Clauses 1-4, wherein the identifying of the relevant portions comprises at least one of adding the page number to a list, based on determining a beginning part and an end part of a relevant portion are on the page, adding the page number to a list, based on determining that the beginning part but not the end part of the relevant portion is on the page, and that the targeted information is on a subsequent page, adding the page number to a list, based on determining that the end part but not the beginning part of the relevant portion is on the page, and that the targeted information is on a previous page, or adding the page number to a list, based on determining that an alphanumeric combination is present on a page.

Clause 6. The method of any of Clauses 1-5, wherein the visual ML is a trained computer vision machine learning model (CVML).

Clause 7. The method of any of Clauses 1-6, wherein the CVML is trained on a custom dataset containing images of digital documents to output coordinates of identified tables in the digital document.

Clause 8. The method of any of Clauses 1-7, further comprising identifying the section via optical character recognition, based on the visual ML failing to identify the section; and outputting coordinates of the section of the image.

Clause 9. The method of any of Clauses 1-8, wherein the section of the image that contains the targeted information comprises at least one of section headers, specific numbers, alphanumeric combinations, or keywords, wherein the identification is undertaken via expression matching in a string of characters.

Clause 10. The method of any of Clauses 1-9, wherein the targeted information extracted by the extraction module is in a 2D data structure.

Clause 11. The method of any of Clauses 1-10, further comprising generating the image of the page corresponding to the page number.

Clause 12. The method of any of Clauses 1-11, wherein the extracting retains a tabular structure of the targeted information.

Clause 13. The method of any of Clauses 1-12, wherein the coordinates border the section containing the targeted information.

Clause 14. A system comprising at least one processor; and at least one non-transitory, computer-readable memory storing instructions that, when executed by the at least one processor, are effective to selecting a page number of a digital document to identify a page containing targeted information; inputting an image of the page into a visual machine learning network (visual ML), wherein the visual ML is trained to recognize text associated with the targeted information in an image; identifying by the visual ML, sections of the image that contain the targeted information; inputting the page number, the digital document, and coordinates of the sections into an extraction module; extracting the targeted information by the extraction module from the sections; inputting the extracted targeted information into a natural language processing ML network (NLP); and identifying at least one data item, by the NLP, based on a structure of the extracted targeted information.

Clause 15. A method to train machine learning networks to autonomously identify targeted information, the method comprising parsing a custom dataset containing texts of digital documents to produce a string of characters; identifying portions in the string of characters containing information; splitting the string of characters into tokens; training a natural language processing ML network (NLP), the training comprising inputting the tokens into the NLP model; and outputting by the NLP model, identifications comprising a first word of a chemical ingredient name, a subsequent word of a chemical ingredient name, or a word not belonging to any chemical ingredient name.

Clause 16. The method of Clause 16, wherein the NLP is a Bidirectional Encoder Representations from Transformers (BERT) Named Entity Recognition (NER) model.

Clause 17. The method of any of Clauses 15-16, further comprising training a visual machine learning network (visual ML) on an image-based dataset, to recognize a location or a boundary of a text associated with pertinent information in an image the training comprising inputting image data from an image-based dataset into the visual ML; and outputting coordinates of identified relevant portions containing the pertinent information.

Clause 18. The method of any of Clauses 15-17, wherein the coordinates border the portions containing the pertinent information.

Clause 19. The method of any of Clauses 15-18, wherein the visual ML is a Cascade Mask R-CNN object detection model.

Clause 20. The method of any one of Clauses 15-19, further comprising selecting a page number of a digital document to identify a page containing targeted information; inputting an image of the page into the trained visual ML; identifying by the trained visual ML, sections of the image that contain the targeted information; inputting the page number, the digital document, and output coordinates of the identified sections into an extraction module; extracting the targeted information by the extraction module from the sections; inputting the extracted targeted information into a natural language processing ML network (NLP); and identifying at least one data item, by the NLP, based on a structure of the extracted targeted information.

The foregoing detailed description has set forth various forms of the systems and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, and/or examples can be implemented, individually and/or collectively, by a wide range of hardware, software, firmware, or virtually any combination thereof. Those skilled in the art will recognize that some aspects of the forms disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as one or more program products in a variety of forms, and that an illustrative form of the subject matter described herein applies regardless of the particular type of signal bearing medium used to actually carry out the distribution.

Instructions used to program logic to perform various disclosed aspects can be stored within a memory in the system, such as dynamic random access memory (DRAM), cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, compact disc, read-only memory (CD-ROMs), and magneto-optical disks, read-only memory (ROMs), random access memory (RAM), erasable programmable read-only memory (EPROM), electrically erasable programmable read-only memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

Any of the software components or functions described in this application, may be implemented as software code to be executed by a processor using any suitable computer language such as, for example, Python, Java, C++ or Perl using, for example, conventional or object-oriented techniques. The software code may be stored as a series of instructions, or commands on a computer readable medium, such as RAM, ROM, a magnetic medium such as a hard-drive or a floppy disk, or an optical medium such as a CD-ROM. Any such computer readable medium may reside on or within a single computational apparatus, and may be present on or within different computational apparatuses within a system or network.

As used in any aspect herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

As used in any aspect herein, the terms "component," "system," "module" and the like can refer to a computer-related entity, either hardware, a combination of hardware and software, software, or software in execution.

As used in any aspect herein, an "algorithm" refers to a self-consistent sequence of steps leading to a desired result, where a "step" refers to a manipulation of physical quantities and/or logic states which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities and/or states.

A network may include a packet switched network. The communication devices may be capable of communicating with each other using a selected packet switched network communications protocol. One example communications protocol may include an Ethernet communications protocol which may be capable of permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in December, 2008 and/or later versions of this standard. Alternatively or additionally, the communication devices may be capable of communicating with each other using an X.25 communications protocol. The X.25 communications protocol may comply or be compatible with a standard promulgated by the International Telecommunication Union-Telecommunication Standardization Sector (ITU-T). Alternatively or additionally, the communication devices may be capable of communicating with each other using a frame relay communications protocol. The frame relay communications protocol may comply or be compatible with a standard promulgated by Consultative Committee for International Telegraph and Telephone (CCITT) and/or the American National Standards Institute (ANSI). Alternatively or additionally, the transceivers may be capable of communicating with each other using an Asynchronous Transfer Mode (ATM) communications protocol. The ATM communications protocol may comply or be compatible with an ATM standard published by the ATM Forum titled "ATM-MPLS Network Interworking 2.0" published August 2001, and/or later versions of this standard. Of course, different and/or after-developed connection-oriented network communication protocols are equally contemplated herein.

Unless specifically stated otherwise as apparent from the foregoing disclosure, it is appreciated that, throughout the present disclosure, discussions using terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

One or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

As used herein, the singular form of "a", "an", and "the" include the plural references unless the context clearly dictates otherwise.

As used herein, the term "comprising" is not intended to be limiting, but may be a transitional term synonymous with "including," "containing," or "characterized by." The term "comprising" may thereby be inclusive or open-ended and does not exclude additional, unrecited elements or method steps when used in a claim. For instance, in describing a method, "comprising" indicates that the claim is open-ended and allows for additional steps. In describing a device, "comprising" may mean that a named element(s) may be essential for an embodiment or aspect, but other elements may be added and still form a construct within the scope of a claim. In contrast, the transitional phrase "consisting of" excludes any element, step, or ingredient not specified in a claim. This is consistent with the use of the term throughout the specification.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material. None is admitted to be prior art.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

What is claimed is:

1. A computer implemented method to automatically index targeted information in a digital document, the method comprising:
   selecting a page number of a digital document to identify a page containing targeted information;
   inputting an image of the page into a visual machine learning network (visual ML), wherein the visual ML is trained to recognize text associated with the targeted information in the image;
   identifying by the visual ML, a section of the image that contains the targeted information;
   inputting the page number, the digital document, and coordinates of the section into an extraction module; and
   extracting the targeted information by the extraction module from the section.

2. The method of claim 1, further comprising:
   inputting the extracted targeted information into a natural language processing ML network (NLP); and
   based on a presence of at least one data item in the extracted targeted information and a structure of the extracted targeted inforamtion, identifying the at least one data item, by the NLP model.

3. The method of claim 1 wherein the selecting comprises:
   parsing the digital document to produce a string of characters; and
   identifying relevant portions in the string of characters containing the targeted information.

4. The method of claim 3 wherein the identifying of the relevant portions comprises:
   splitting the string of characters into tokens;
   inputting the tokens into a natural language processing ML network (NLP); and
   identifying by the NLP a first word of a chemical ingredient name, a subsequent word of a chemical ingredient name, or a word not belonging to any chemical ingredient name.

5. The method of claim 3, wherein the identifying of the relevant portions comprises at least one of:
   adding the page number to a list, based on determining a beginning part and an end part of a relevant portion are on the page,
   adding the page number to a list, based on determining that the beginning part but not the end part of the relevant portion is on the page, and that the targeted information is on a subsequent page,
   adding the page number to a list, based on determining that the end part but not the beginning part of the relevant portion is on the page, and that the targeted information is on a previous page, or
   adding the page number to a list, based on determining that an alphanumeric combination is present on a page.

6. The method of claim 1 wherein the visual ML is a trained computer vision machine learning model (CVML).

7. The method of claim 6, wherein the CVML is trained on a custom dataset containing images of digital documents to output coordinates of identified tables in the digital document.

8. The method of claim 1, further comprising:
   identifying the section via optical character recognition, based on the visual ML failing to identify the section; and
   outputting coordinates of the section of the image.

9. The method of claim 8 wherein the section of the image that contains the targeted information comprises at least one of:
   section headers, specific numbers, alphanumeric combinations, or keywords, wherein the identification is undertaken via expression matching in a string of characters.

10. The method of claim 1, wherein the targeted information extracted by the extraction module is in a 2D data structure.

11. The method of claim 1, further comprising:
    generating the image of the page corresponding to the page number.

12. The method of claim 1, wherein the extracting retains a tabular structure of the targeted information.

13. The method of claim 1, wherein the coordinates border the section containing the targeted information.

14. A system comprising:
    at least one processor; and
    at least one non-transitory, computer-readable memory storing instructions that, when executed by the at least one processor, are effective to:
    select a page number of a digital document to identify a page containing targeted information;
    input an image of the page into a visual machine learning network (visual ML), wherein the visual ML is trained to recognize text associated with the targeted information in an image;
    identify, by the visual ML, sections of the image that contain the targeted information;
    input the page number, the digital document, and coordinates of the sections into an extraction module;
    extract the targeted information by the extraction module from the sections;
    input the extracted targeted information into a natural language processing ML network (NLP); and
    identify at least one data item, by the NLP, based on a structure of the extracted targeted information.

15. A method to train machine learning networks to autonomously identify targeted information, the method comprising:
    parsing a custom dataset containing texts of digital documents to produce a string of characters;
    identifying portions in the string of characters containing information;
    splitting the string of characters into tokens;
    training a natural language processing ML network (NLP), the training comprising:
    inputting the tokens into the NLP model; and
    outputting by the NLP model, identifications comprising a first word of a chemical ingredient name, a subsequent word of a chemical ingredient name, or a word not belonging to any chemical ingredient name.

16. The method of claim 15 wherein the NLP is a Bidirectional Encoder Representations from Transformers (BERT) Named Entity Recognition (NER) model.

17. The method of claim 15 further comprising training a visual machine learning network (visual ML) on an image-based dataset, to recognize a location or a boundary of a text associated with pertinent information in an image, the training comprising:
   inputting image data from an image-based dataset into the visual ML; and
   outputting coordinates of identified relevant portions containing the pertinent information.

18. The method of claim 17, wherein the coordinates border the portions containing the pertinent information.

19. The method of claim 17, wherein the visual ML is a Cascade Mask R-CNN object detection model.

20. The method of claim 17, further comprising:
   selecting a page number of a digital document to identify a page containing targeted information;
   inputting an image of the page into the trained visual ML;
   identifying by the trained visual ML, sections of the image that contain the targeted information;
   inputting the page number, the digital document, and output coordinates of the identified sections into an extraction module;
   extracting the targeted information by the extraction module from the sections;
   inputting the extracted targeted information into a natural language processing ML network (NLP); and
   identifying at least one data item, by the NLP, based on a structure of the extracted targeted information.

* * * * *